P. M. SPINK.
ELECTRIC HEATER AND COOKER.
APPLICATION FILED FEB. 23, 1918.
1,293,964.
Patented Feb. 11, 1919.
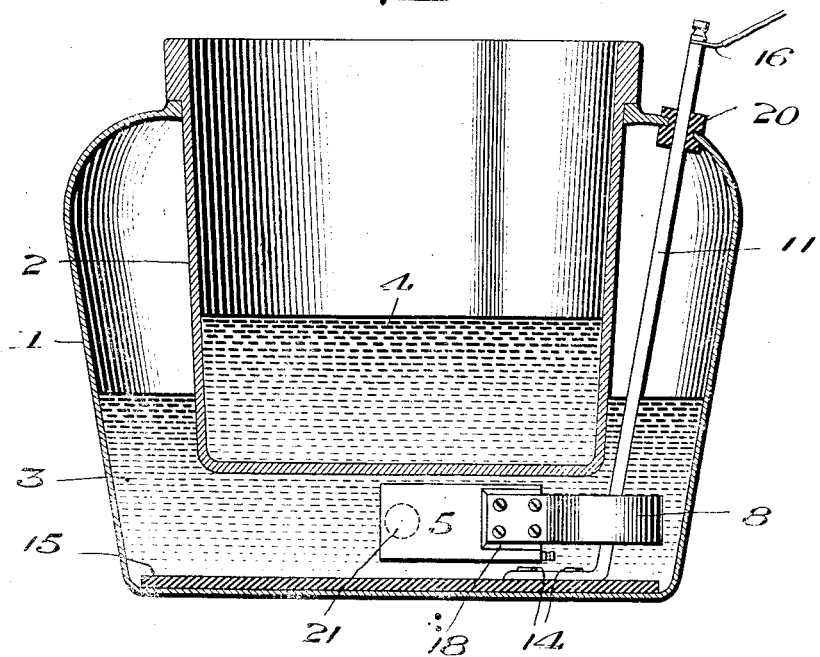
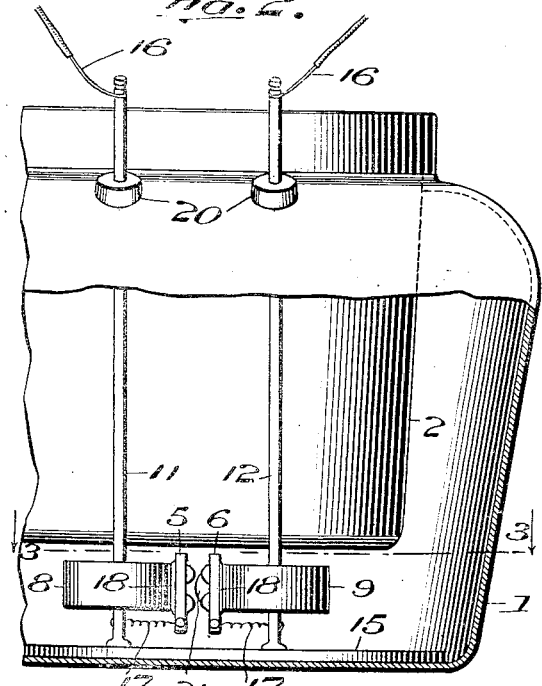
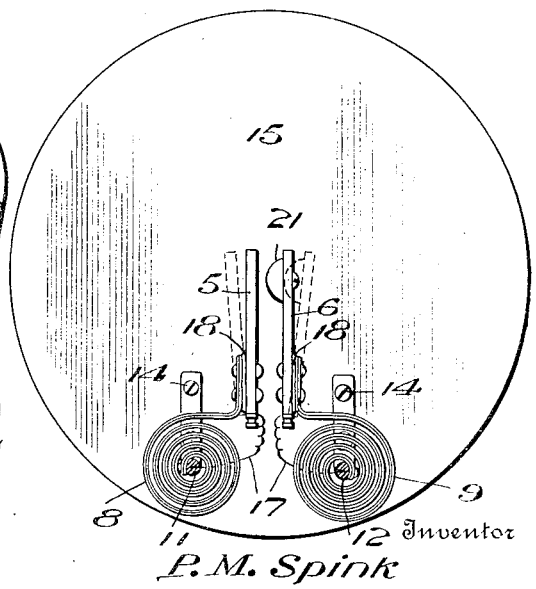
Inventor
P. M. Spink
Witnesses
Philip E. Barnes
By Eugene C. Brown
Attorney

UNITED STATES PATENT OFFICE.

PERL MONROE SPINK, OF WORTHINGTON, MINNESOTA.

ELECTRIC HEATER AND COOKER.

1,293,964.  Specification of Letters Patent.  Patented Feb. 11, 1919.

Application filed February 23, 1918. Serial No. 218,811.

*To all whom it may concern:*

Be it known that I, PERL MONROE SPINK, a citizen of the United States, residing at Worthington, in the county of Nobles and State of Minnesota, have invented certain new and useful Improvements in Electric Heaters and Cookers, of which the following is a specification.

This invention relates to electric heaters and more particularly to water heaters adapted for use in cooking food, heating glue, etc.

One of the objects of my invention is to provide an electric heating device which may be immersed in the water to be heated or vaporized for the purpose of heating a superposed vessel, the container and vessel constituting a double boiler of the usual type. A further object of my invention is to provide an electric heating device which will automatically vary the distance between the electrodes in accordance with the heat developed, thereby increasing the resistance and cutting down the amount of electricity consumed.

In the accompanying drawings Figure 1 is a vertical sectional view of a double boiler to which is applied one form of my electric heating device; Fig. 2 is an end elevation of the same, partly in section; and Fig. 3 is a top plan view of the electric heating device taken on the line 3—3 of Fig. 2.

The heating vessel may be of the usual double-boiler type having an outer container 1 and an inner receptacle 2 fitting therein and suspended above the bottom of the container to thereby provide an interspace for the water 3 which is to be heated in order to cook the material or substances indicated at 4 within the inner receptacle. The latter may be provided with a cover, of course, if it is desirable.

The electric heating device comprises conductor plates or electrodes 5, 6 of any suitable material such as metal, carbon, or other material that will not be decomposed or disintegrated by electrolytic action, which are supported upon the outer ends of thermostatic coils 8, 9, constructed of strips of two or more dissimilar materials which are oppositely affected by an increase or decrease in temperature as is well understood, whereby upon an increase in temperature the coils have a tendency to open outwardly or unwind, thereby moving the electrodes 5, 6 away from each other, while a decrease in temperature has the opposite effect and brings the electrodes closer to each other. The inner ends of the thermostatic coils are riveted or otherwise secured to rods 11, 12, the latter being secured by screws or bolts 14 to a base plate 15 of rubber, gutta-percha or other suitable material. The rods may also constitute leading-in conductors and may be connected at their outer ends to the conductor wires 16 which are connected to any suitable source of electric energy, while the inner ends are connected by wires 17 with the electrodes. The rods are preferably covered by some insulating coating and the electrodes are insulated from the supporting coils by interposed insulation 18. I have shown the rods passing through bushings 20 which are inserted in apertures in the container, but it is evident that the heating device may merely be inserted through the opening of the outer container. In order to prevent accidental contact or short-circuiting of the electrodes, an insulating lug 21 may be attached to one of the electrodes.

It will be understood that in the use of my apparatus the amount of water which it is desired to heat or vaporize is placed in the outer container 1 and the cooking vessel 4 containing the materials to be heated or cooked are then placed in the inner vessel 2, the latter being inserted in the container in the manner indicated in Fig. 1. The conductors 16 are then connected with the source of electric energy, as by turning on a switch, if the conductors are connected to a plug inserted in the usual electric light socket, and the electric current will then flow from one electrode plate 5 to the other electrode 6 and the heat generated, by reason of the resistance of the water between the electrodes, will heat the liquid and eventually will convert it into vapor or steam. The heated water and vapor surrounding the inner vessel provide the heat necessary to cook the materials contained therein.

As is well known after the heating water 3 in the container has been brought to the boiling point or proper cooking temperature, it requires less energy to maintain the same degree of heat necessary to continue the cooking operation and I have, therefore, provided means for automatically conserving energy and preventing a waste of the electric energy by increasing the resistance in accordance with the increase in temperature, thereby cutting down the amount of electricity flowing through the circuit. This is affected automatically by the operation of the thermostatic coils 8 and 9 which unwind and open outwardly as the temperature increases, thereby separating the electrodes and increasing the resistance of the liquid path therebetween. The thermostatic supports 8, 9 can be so proportioned and constructed that their outward movement will not begin until a certain predetermined temperature has been produced and also so that the increment of separation will be in accordance with the further increase in temperature and in the desired proportion or degree.

The amount of liquid which is vaporized and consequently, the duration of the vaporizing period may be predetermined to suit varying conditions by increasing or decreasing the amount of water placed in the outer container. It will be evident also, that the current will be automatically cut off when the water 3 boils away until it no longer connects the electrodes. Consequently, there is no danger of burning the materials undergoing the cooking operation or of burning out and injuring the containing vessels. All of these several advantages will be especially appreciated by those who are familiar with the operation and use of electric heating devices.

Many changes and modifications will occur to engineers and those skilled in the art and I desire, therefore, that all modifications falling within the scope of the appended claims shall be regarded as pertaining to my invention, even though they are not specifically shown and described.

I claim:—

1. An electric heater for heating liquids, comprising separated electrodes each carried by a thermostatic device insulated therefrom and adapted to move the electrodes away from each other after a predetermined temperature is reached in the surrounding liquid medium.

2. An electric heating device for heating liquids, comprising standards, thermostatic supports secured thereto, electrodes carried by said supports and adapted to be immersed in the liquid heating medium, and means for supplying electric current to said electrodes.

3. An electric heating device for heating liquids comprising a base member, standards secured thereto, thermostatic supports fastened to said standards, electrodes carried by said supports and adapted to be immersed in a liquid heating medium, and means for connecting said electrodes to a source of electric supply.

4. An electric heating device for heating liquids, comprising a liquid container or vessel, separated electrodes adapted to be immersed in the liquid within said vessel, means for supplying an electric current to said electrodes, and means for automatically moving said electrodes farther away from each other when the liquid has attained a predetermined temperature.

In testimony whereof I affix my signature.

P. MONROE SPINK.

Witnesses:
  E. J. JONES,
  FRANK PARTRIDGE.